H. E. GOLDBERG, (NOW BY JUDICIAL CHANGE OF NAME H. GOLBER.)
CALCULATING MACHINE.
APPLICATION FILED MAY 16, 1912.
1,298,198.
Patented Mar. 25, 1919.
4 SHEETS—SHEET 1.
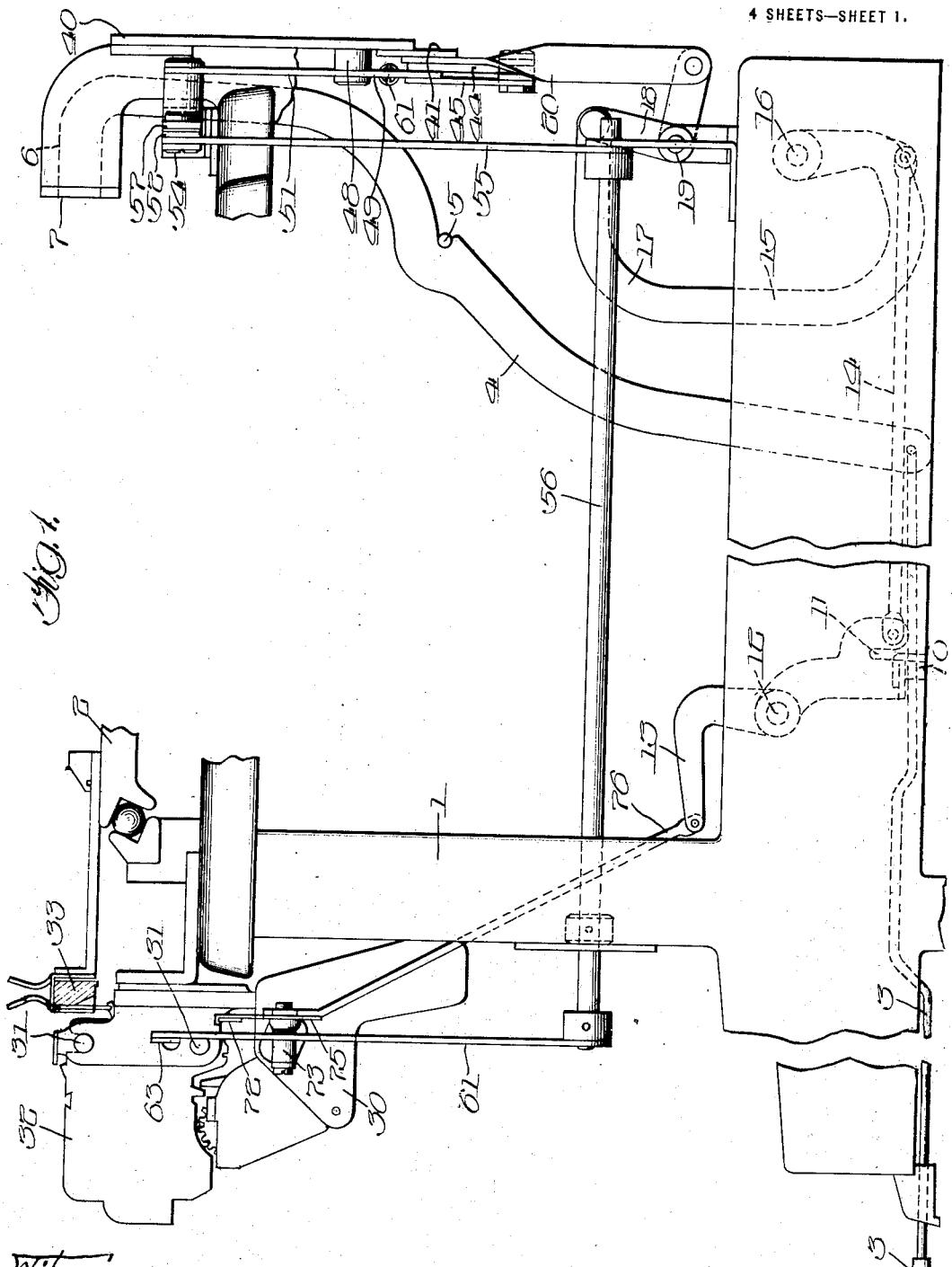

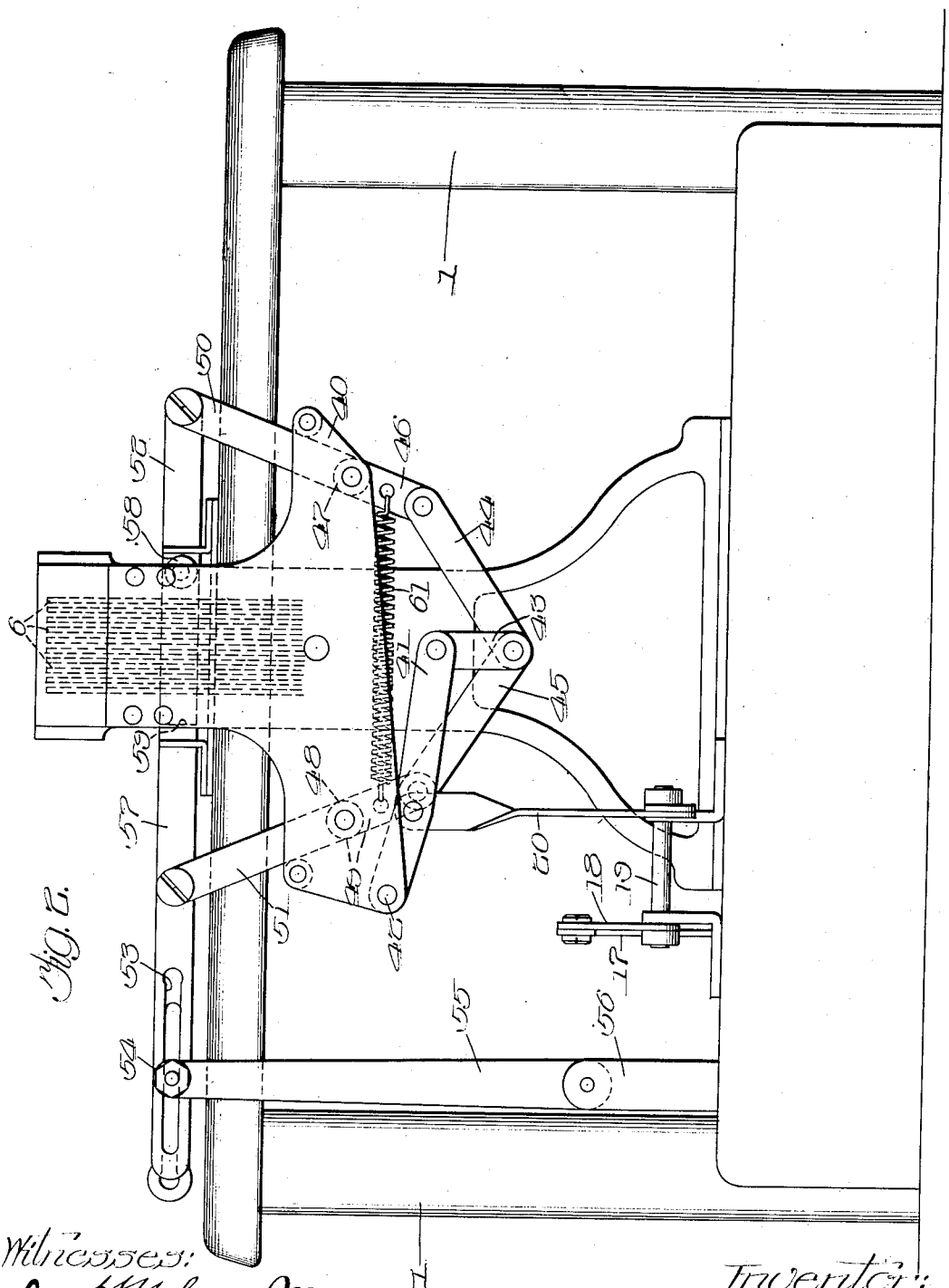

H. E. GOLDBERG, (NOW BY JUDICIAL CHANGE OF NAME H. GOLBER.)
CALCULATING MACHINE.
APPLICATION FILED MAY 16, 1912.
1,298,198.
Patented Mar. 25, 1919.
4 SHEETS—SHEET 3.
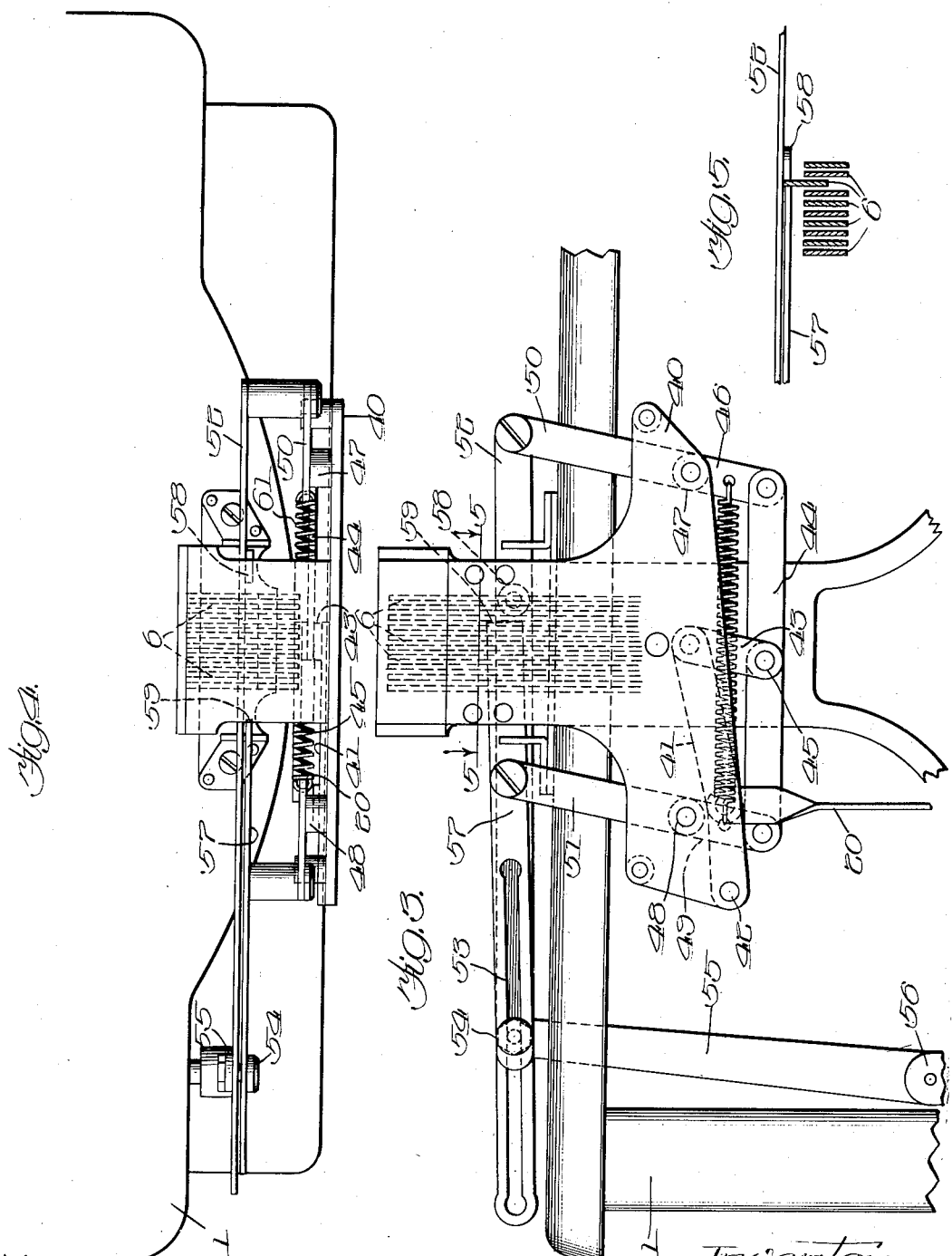
Witnesses:
Inventor:
Hyman Eli Goldberg H. E. GOLDBERG, (NOW BY JUDICIAL CHANGE OF NAME H. GOLBER.)
CALCULATING MACHINE.
APPLICATION FILED MAY 16, 1912.
1,298,198.
Patented Mar. 25, 1919.
4 SHEETS—SHEET 4.
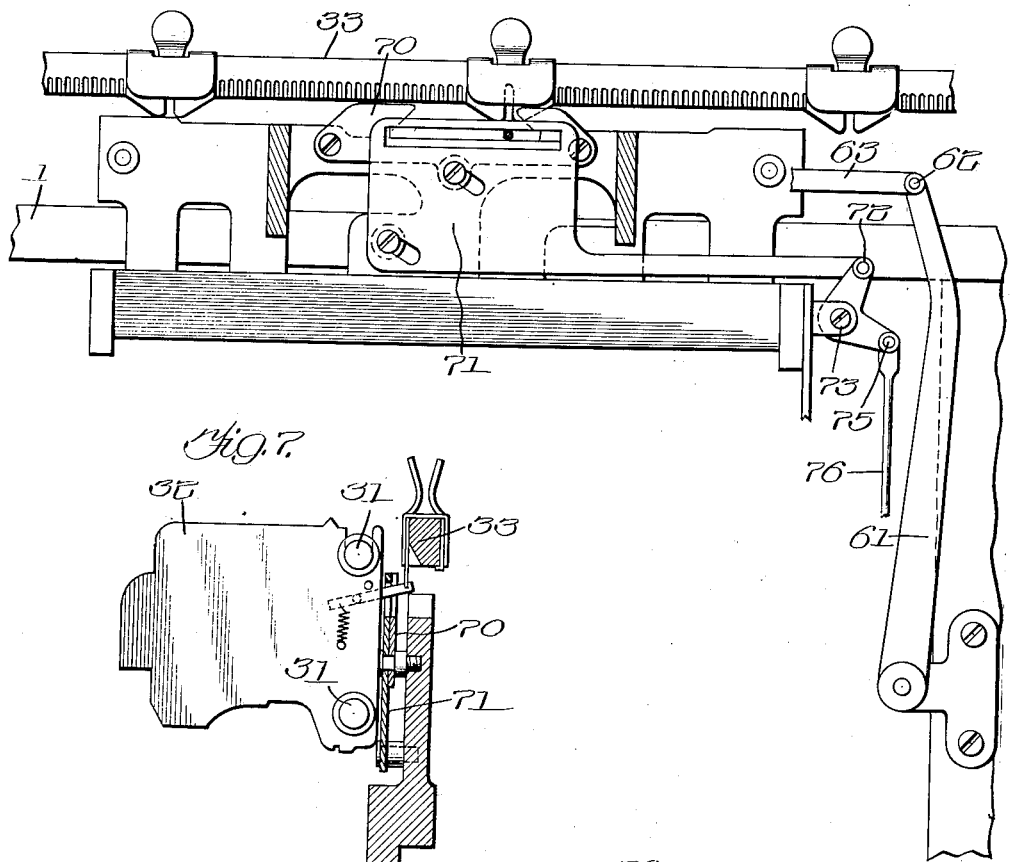
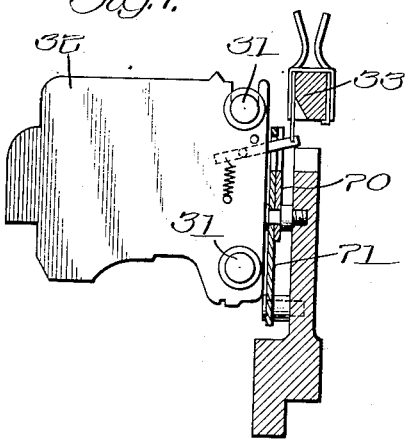
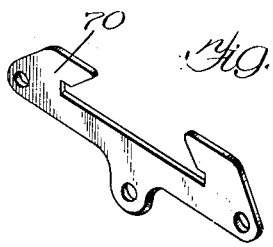
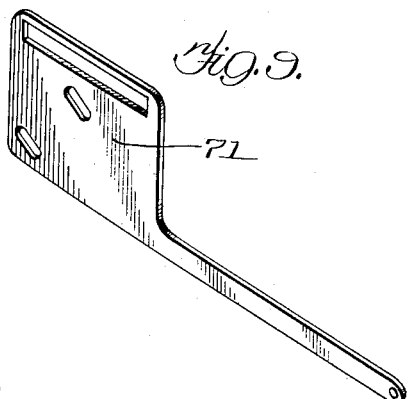
Witnesses:
Jno. H. Nelson Jr.
Edwin B. Nelson
Inventor:
Hyman Eli Goldberg

UNITED STATES PATENT OFFICE.

HYMAN ELI GOLDBERG, (NOW BY JUDICIAL CHANGE OF NAME HYMAN GOLBER,) OF CHICAGO, ILLINOIS, ASSIGNOR TO GOLDBERG CALCULATING MACHINE COMPANY, OF CHICAGO, ILLINOIS.

CALCULATING-MACHINE.

1,298,198.   Specification of Letters Patent.   Patented Mar. 25, 1919.

Application filed May 16, 1912. Serial No. 697,704.

*To all whom it may concern:*

Be it known that I, HYMAN ELI GOLDBERG, a citizen of the United States, residing at Chicago, in the county of Cook and State of Illinois, have invented certain new and useful Improvements in Calculating-Machines, of which the following is a specification.

My invention is a calculating machine and has particular reference to the means for locating the totalizer of the calculating machine. On August 21, 1911, there was filed by John C. Wahl an application which showed a calculating machine as an attachment to a typewriter. The typewriter was the ordinary Remington No. 11 now on the market, and the calculating machine resembled very much the one now on the market in connection with said Remington typewriter, the description of which can be found in Patent No. 893,719, issued July 21, 1908. There were, of course, new features, and these features referred particularly to the means for re-locating the totalizer for a new number, not by means of any connection to the carriage of the typewriter, but by means of a connection manually operated through the intermediation of the regular Gorin tabulator. After the totalizer had thus been properly located for the new number it became automatically connected to the carriage of the typewriter and for the rest of that number was guided in its movements by said typewriter carriage.

The mechanism shown in said application practically reproduced another decimal tabulator. It was found to be possible to avoid this duplication of mechanism, and this is the main object of my invention. It might therefore be said that among the objects of my invention is the construction of a mechanism coöperating as far as possible with the ordinary standard decimal tabulator now on the market in connection with the Remington typewriter and functioning to properly re-locate a totalizer for a new number, and then to automatically connect said totalizer to the carriage of the typewriter for the rest of said number.

The invention is illustrated by several sheets of drawings and various figures thereon. Of these figures,—

Figure 1 represents an end view of the typewriter, calculating mechanism thereon, and tabulator thereon. This view is taken partly in elevation and partly in section. The parts are broken in various places and moved more closely together to bring them all within the sheet.

Fig. 2 is an elevation of the back of the typewriter. It is intended to illustrate particularly the parts coöperating with the tabulator decimal parts.

Fig. 3 shows a portion of the parts shown in Fig. 2, but in a different operating position.

Fig. 4 is a top view of the same parts.

Fig. 5 is a small section taken along the line 5—5 of Fig. 3.

Fig. 6 is a front elevation of the front portion of the machine, and shows some of the parts operating to locate the totalizer.

Figs. 7, 8 and 9 show some details.

There will first be described the typewriter, the tabulator and the calculating machine as far as they are now on the market, before even entering upon the new portions.

The typewriter has its ordinary framing 1, within which are mounted the ordinary letter and numeral keys, type basket, escapement mechanism, ribbon movement, etc. These are all as ordinary, and a good many of them are not even represented. They are all supposed to be present in the machine. Mounted on top of the framing 1 is the carriage 2, which travels as is usual and advances one step for the operating of any key of the typewriter. Of course, there are present upon the carriage, the platen and other paper-holding devices, etc. Mounted at the bottom of the framing of the typewriter is a set of tabulator push-buttons 3. Ordinarily there are eight or nine of them. Each push button is mounted upon the front end of a wire slidably supported in the framing and somewhat bent to avoid interference. At its back end, the wire is connected to the bottom of a tabulator decimal stopping piece 4. There are therefore as many stopping pieces 4 as there are tabulator push-buttons 3. The stopping pieces are all rotatably mounted upon a common fulcrum 5 and have their upper ends 6 guided in a grating 7. The pushing in of any one of the push buttons 3 therefore protrudes the end 6 of the stopping piece through the grating 7 toward the operator or front of the machine. Of course, these stopping pieces coöperate with the regular stop plates mounted upon the carriage of the typewriter, as is usual.

Moreover, the stopping pieces 4 coöperate with the escapement of the carriage to release the carriage to allow the same to advance under the influence of its spring, as is usual. But as all these parts are old, I shall not describe them further.

Mounted upon each one of the tabulator wires 3 is a lug 10. All these lugs coöperate with a cross bar 11 which is supported to rotate about a fulcrum 12 in the framing of the machine. Forming one piece with said cross bar 11 and extending forward is an arm 13. Extending to the back from said cross bar is a link 14, which in its turn is connected to a C-shaped piece 15 which is fulcrumed at 16 and has a portion extending around to avoid interference, and finally at its upper portion ends in a part 17. The part 17 in its turn is connected to the upper end of a bell crank 18 fulcrumed at 19 and provided with an arm extending toward the back and connected at its end to the lower end of a link 20. All the parts so far mentioned except part 20 are to be found in the machine as placed upon the market.

Mounted in the front portion of the typewriter is the actuator or master mechanism 30 suitably connected by means of links to the numeral key levers of the typewriter. The actuator differs in nowise from the one regularly now on the market. Slidably mounted on proper guide bars 31 fastened to the framing of the actuator is a totalizer 32. The totalizer also does not differ in any manner from the regular totalizer now on the market. Connected to and carried along by the carriage of the typewriter is a bar 33.

The above describes practically all the old parts, and now the description and function of the new parts will be taken up.

The new mechanism might be subdivided into two distinct portions: (1) the means for locating the totalizer in the proper decimal place; and (2) the means for disconnecting the totalizer from the bar 33 of the carriage. The first of these means will now be taken up.

Mounted in a suitable framing 40, which forms an extension of the ordinary framing of the typewriter, is a lever 41 fulcrumed at 42. The lever is connected to the upper end of the link 20 previously mentioned. At its outer end the lever 41 is connected to the upper end of a link 43, which in its turn, at its lower end, is connected to a stud passing through two pieces 44, on one side and 45 on the other side. The link 44 in its turn, at its other end, is connected to the lower end of a lever 46 pivotally mounted upon the framing at 47, and the link 45 is similarly connected to a lever 48, also pivotally mounted on the framing at 49. The distance between the fulcrums 47 and 49 is exactly equal to the sum of the lengths of the links 44 and 45. Moreover, the length of the link 43 is exactly equal to the length of the lower arms of the levers 46 and 48 (Fig. 3). The lever 46 is provided with an upper arm 50, and the lever 48 is similarly provided with an upper arm 51, these two upper arms being equal in length to each other. Connected to arm 50 is a plate 52 which is thus supported at one end by being fulcrumed to 50, and at its other end by having provided therein a slot 53 wherein is embraced a stud 54 mounted in the upper end of an arm 55, which arm is fulcrumed at 56 in the framing of the machine. Similarly, the other arm 51 has connected to its upper end a plate 57 which is similarly provided with a slot 53, which also embraces the stud 54. It is evident that the plates 52 and 57 are thus free to be given a horizontal movement from right to left, and although it is not theoretically true that this movement is exactly horizontal, still it is sufficiently so for all practical purposes, and will therefore in the further description be assumed to be quite so. The plate 52 is provided with a stud 58 rigidly fastened thereto, and the plate 57 is shaped with a squared end 59 (Fig. 5).

On account of the construction of the parts, and particularly on account of the length of the parts, it is evident that when the link 20 is raised and the lever 41 is thus swung about its fulcrum 42 until its pivot point with the link 43 comes in line with the fulcrums 47 and 49, then the links 44 and 45 also straighten out, and the whole mechanism forms a set of parallelograms. The upper parts of the levers 50 and 51 therefore also form a parallelogram. Attention is called to the fact that this state persists even if the levers 46 and 48 are swung about their fulcrums 47 and 49. The distance between the corresponding parts of these levers will always be constant and equal in length to the distance between the fulcrums 47 and 49. By examining Fig. 5 it will be seen that the distance between the adjacent end of the stud 58 and the edge 59 of the plate 57 is equal to the thickness of one of the tabulator stopping pieces 6. It is therefore evident that if any one stopping piece 6 be intruded in the pathway of the parts 58 and 59, and the link 20 be raised to bring the parts above described from their position shown in Fig. 2 to the position shown in Fig. 3, then necessarily the parts 58 and 59 will positively close upon the intruded stopping piece 6 and will locate themselves on each side thereof, but without any cramping at any portion of the mechanism. Moreover, this is true for any stopping piece 6. The intruding of any stopping piece 6 and the raising of the link 20 through a constant amount will therefore result in positively locating the plate 52 and the plate 57, each one in a place dependent upon the stopping piece 6 then coöperating with it.

The normal position of the parts is shown in Fig. 2. It is, of course, understood that the link 20 is normally kept in its down position, being returned thereto by a spring upon the tabulator portion of the machine. Normally therefore the lever 41 and link 43 are in their lowered positions, and the links 44 and 45 are therefore not collinear with each other, but at an angle. This therefore causes the lower ends of the levers 50 and 51 to approach each other, and the upper ends therefore to recede from each other. The parts 58 and 59 are therefore carried away from each other, and normally are sufficiently far apart to allow room for the intrusion of any one of the stopping pieces 6 of the tabulator.

Attention is called to the fact that as the link 20 always reaches the same position when it resumes its normal position, and always reaches the same position when it is raised into its operative position, not only do the two plates 52 and 57 close down upon the included stopping piece, but also that the sum of the movements of the plates 52 and 57 is constant no matter which is the stopping piece coöperating. What either plate may lack in movement the other one gains. Advantage has been taken of this fact to locate the stud 54 in a proper position. This is accomplished by making the slot 53 in plate 52 coöperate with its stud by means of its right edge only, the slot being sufficiently long so that the other edge need not coöperate, and by making the slot in plate 57 coöperate with the stud 54 by means of its left edge only. Moreover, the distance between the coöperating edge of the slot in plate 52 and the contacting edge 58 thereon is made equal to the distance between the similar edges on plate 57. As in the operating of the mechanism the contacting edges 58 and 59 always reach a uniform distance apart, namely the thickness of one of the stopping pieces 6 (Fig. 5); therefore so do also the contacting edges of the slots 53 of said plates. To prevent any back lash between the parts, the stud 54 is made of a diameter sufficiently large to completely fill the space between the contacting edges of the slots 53 when in their closed position. Moreover, this definite position of the stud 54 corresponds to the position of the included stopping piece 6. Upon the return of the parts to normal position, the stud 54 and lever 55 are unaffected.

The lever 55 is rigidly fastened to the shaft 56 which has previously been mentioned as its fulcrum, and the shaft 56 in its turn has mounted thereon at the front of the machine a lever 61 which is equal in length and similarly mounted to the lever 55. At its upper end the lever 61 is provided with a joint 62 connecting it to a link 63 connecting it to the framing of the totalizer 32. It is therefore evident that the locating of the stud 54 results in the simultaneous locating of the totalizer 32 in a corresponding place. In fact, the movement of the stud 54 and the totalizer 32 is not only corresponding but equal. Thus, finally, the operating of any of the tabulator push-buttons results in the locating of the totalizer in a place dependent upon the value of the tabulator push-button operated.

It has been previously mentioned that a mechanism having for its object the same results as the one described here has been shown in the application mentioned above, namely that of John C. Wahl, Serial No. 645,259. In that application there is thoroughly described the mechanism by means of which the totalizer is disconnected from the carriage bar 33 and then re-connected thereto. It suffices to say that in Fig. 7 is shown a view absolutely similar to a view shown in said application, showing a part of the mechanism for this purpose; and that in Fig. 8 is shown the piece 70, which can also be seen in Fig. 6, whose function it is to automatically disconnect the totalizer from the carriage bar 33 whenever the latter passes beyond the capacity of the totalizer in either direction; and that in Fig. 9 is shown the piece 71, which is also shown in Fig. 6, and whose function it is to disconnect the totalizer from the carriage bar 33 whenever a tabulator push-button is operated. This, as thoroughly described in said application, is accomplished by moving said plate 71 to the right as viewed from the front of the machine or as viewed in Fig. 6. This in its turn is accomplished by connecting the right end of said plate 71 to the end of the upper arm of a lever 72 fulcrumed at 73 to the framing of the actuator, and connected by means of an arm 74 to the upper end of a link 75, which in its turn is connected by means of its lower end 76 to the arm 13 previously described (Fig. 1). It is, of course, understood that the parts are shaped so that the timing is proper. Upon the operating of a tabulator push-button, first the lug 10 pushes back the bar 11, and resultantly, by means of the intermediate mechanism 13, 76, 75, 74, 72 and 71, the totalizer is disconnected from the carriage bar 33. Simultaneously therewith the stopping piece 6 is moved forward ready to coöperate with the rest of the mechanism previously described. The continuation of the moving of the push button 3 by means of the intermediate mechanism 15, 17, 18, the link 20, the parallelogram described and the plates 52 and 57, results in the locating of the stud 54 in the proper location, and therefore also results in the bringing of the totalizer 32 into the proper location. Moreover, by means of the tabulator connection to the typewriter carriage, the latter also has been advanced a column and been located at its proper decimal place for this new column. The carriage bar 33 and the totalizer 32 are therefore re-alined, both of them in their proper decimal place, ready to coöperate for a new column, but they are not yet connected to each other. Upon the withdrawal of the finger from the tabulator push-button, all the parts resume their normal positions and the totalizer becomes automatically connected to said carriage bar in the manner described in the previous cited application.

The mechanism here used for locating the totalizer is positive in the sense that it does not depend on any springs or other elastic members. This is accomplished through the intermediation of the two members one of which contacts with the tabulator stopping piece on one side and the other member contacts with the tabulator stopping piece on the other side. While the amount of movement that each member may receive is a variable quantity, yet the amount of movement that both members together receive is always a constant quantity, their aggregate movement is therefore a constant quantity. The mechanism by means of which this is accomplished and which is above described may therefore be called a mechanism for producing a constant aggregate movement. It is evident that in order to accomplish the result above described any one of the well known constant aggregate-movement-mechanisms may be used.

As is well known in the calculating machine in which the figures are entered not simultaneously but *seriatim*, there is usually provided some member that moves step-wise and whose location determines the particular decimal point of entry of the figure. This particular member, no matter what it is, will be called the calculating carriage. As is well known sometimes the calculating carriage is the totalizer itself. This is the case in the mechanism described above. It may be the master wheel as is the case in the well-known Elliott-Fisher machine. Again it may be some other member which is neither the totalizer nor the master wheel, but a trigger, etc. It is evident that the principle of the invention above described applies without change to any calculating carriage and I wish it so understood in the claims.

In the claims I use the expression "in a machine of the type described." This is done to avoid repetition of a long description. By the expression I mean " a machine which is capable of both typewriting and calculating and which is provided with a decimal tabulator for the proper location of the typewriting carriage to thereby locate the printing at a desired point upon the paper, and which is also provided with a calculating carriage whose location determines the decimal place of the number entered in the calculating part of the machine."

Having thus described my invention I claim:

1. In a machine of the type described, the combination of a set of displaceable stopping pieces, a calculating carriage adapted to be tabulated in either direction, and mechanism locating said carriage at a place dependent on a particular displaced stop.

2. In a machine of the type described, the combination of a set of displaceable stopping pieces, a calculating carriage adapted to be tabulated in either direction, and mechanism contacting with any displaced stopping piece and thereby locating the calculating carriage at a predetermined place.

3. In a machine of the type described, the combination of a set of displaceable stopping pieces and a constant aggregate mechanism contacting with the displaced stopping piece, whereby said mechanism is located at a predetermined place dependent upon the particular piece displaced.

4. In a machine of the type described, the combination of a calculating carriage, a set of displaceable stopping pieces and a constant aggregate mechanism coöperating with the displaced stopping piece by contacting both sides thereof simultaneously to thereby locate the calculating carriage at a predetermined place.

5. In a machine of the type described, the combination of a calculating carriage, a set of tabulator push buttons, a tabulator stopping piece for each button and displaceable by the pushing thereof, a constant aggregate mechanism operated by each of said buttons and contacting with the tabulator stopping piece displaced, whereby said mechanism is located at a predetermined and different location for each of said buttons, and a connection from said mechanism to the calculating carriage whereby said carriage is located at a corresponding place.

6. In a machine of the type described, the combination of a calculating carriage, a set of tabulator push buttons, a set of tabulator stopping pieces one for each button and displaceable by the pushing thereof, a general bar movable by the pushing of any button, a mechanism contacting with the displaced stopping piece and moved by the general bar, and a connection between said mechanism and the calculating carriage, whereby the latter is located at a place dependent on the particular button pushed.

7. In a machine of the type described, the combination of a calculating carriage, a set of tabulator push buttons, a set of tabulator stopping pieces, one for each button, and displaceable by the pushing thereof, a general bar movable by the pushing of any button, and a constant aggregate mechanism contacting with both sides of the displaced stopping piece and moved by the general bar and thus positively located, and a connection between said mechanism and the calculating carriage, whereby the latter is located at a place dependent on the particular button pushed.

8. In a machine of the type described, the combination of a set of displaceable stopping pieces, a totalizer adapted to be tabulated in either direction, and mechanism locating said totalizer at a place dependent on a particular displaced stop.

9. In a machine of the type described, the combination of a set of displaceable stopping pieces, a totalizer adapted to be tabulated in either direction, and mechanism contacting with any displaced stopping piece and thereby locating the totalizer at a predetermined place.

10. In a machine of the type described, the combination of a totalizer, a set of displaceable stopping pieces, and a constant aggregate mechanism coöperating with the displaced stopping piece by contacting both sides thereof simultaneously to thereby locate the totalizer at a predetermined place.

11. In a machine of the type described, the combination of a totalizer, a set of tabulator push-buttons, a tabulator stopping piece for each button and displaceable by the pushing thereof, a constant aggregate mechanism operated by each of said buttons and contacting with the tabulator stopping piece displaced, whereby said mechanism is located at a predetermined and different location for each of said buttons, and a connection from said mechanism to the totalizer, whereby said totalizer is located at a corresponding place.

12. In a machine of the type described, the combination of a totalizer, a set of tabulator push-buttons, a set of tabulator stopping pieces, one for each button, and displaceable by the pushing thereof, a general bar movable by the pushing of any button, a mechanism contacting with the displaced stopping piece and moved by the general bar, and a connection between said mechanism and the totalizer, whereby the latter is located at a place dependent on the particular button pushed.

13. In a machine of the type described, the combination of a totalizer, a set of tabulator push-buttons, a set of tabulator stopping pieces, one for each button, and displaceable by the pushing thereof, a general bar movable by the pushing of any button, and a constant aggregate mechanism contacting with both sides of the displaced stopping piece and moved by the general bar and thus positively located, and a connection between said mechanism and the totalizer, whereby the latter is located at a place dependent upon the particular button pushed.

In witness whereof I have hereunto signed my name this 14th day of May, 1912.

HYMAN ELI GOLDBERG.

Witnesses:
T. G. Frankel,
Julia M. Bristol.